United States Patent
Strandjord et al.

(10) Patent No.: US 8,213,019 B2
(45) Date of Patent: Jul. 3, 2012

(54) RFOG WITH OPTICAL HETERODYNING FOR OPTICAL SIGNAL DISCRIMINATION

(75) Inventors: Lee K. Strandjord, Tonka Bay, MN (US); Glen A. Sanders, Scottsdale, AZ (US); Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 119 days.

(21) Appl. No.: 12/876,796

(22) Filed: Sep. 7, 2010

(65) Prior Publication Data
US 2012/0057167 A1    Mar. 8, 2012

(51) Int. Cl.
G01C 19/72    (2006.01)
(52) U.S. Cl. .................................. 356/461
(58) Field of Classification Search ............ 356/460, 356/461, 484
See application file for complete search history.

(56) References Cited

U.S. PATENT DOCUMENTS

| | | |
|---|---|---|
| 3,861,220 A | 1/1975 | Felsenthal, Jr. |
| 4,135,822 A | 1/1979 | Ezekiel |
| 4,274,742 A | 6/1981 | Lustig |
| 4,323,310 A | 4/1982 | Shaw |
| 4,352,562 A | 10/1982 | Minden |
| 4,673,293 A | 6/1987 | Sanders |
| 4,702,600 A | 10/1987 | Handrich et al. |
| 4,807,999 A | 2/1989 | Soo Hoo |
| 4,863,272 A | 9/1989 | Coccoli |
| 5,018,857 A | 5/1991 | Sanders |
| 5,090,809 A | 2/1992 | Ferrar |
| 5,131,749 A | 7/1992 | Varnham |
| RE34,121 E | 11/1992 | Benoist |
| 5,229,831 A | 7/1993 | Carroll |
| 5,237,387 A | 8/1993 | Sanders |
| 5,289,258 A | 2/1994 | Szafraniec |
| 5,296,912 A | 3/1994 | Strandjord et al. |

(Continued)

FOREIGN PATENT DOCUMENTS
EP    0240949    10/1987
(Continued)

OTHER PUBLICATIONS

Broeng et al, "Photonic Crystal Fibers: A New Class of Optical Waveguides", "Optical Fiber Technology", 1999, pp. 305-330, vol. 5, Publisher: Academic Press.

(Continued)

*Primary Examiner* — Tarifur Chowdhury
*Assistant Examiner* — Jonathan Hansen
(74) *Attorney, Agent, or Firm* — Fogg & Powers LLC

(57) ABSTRACT

A RFOG comprises a reference laser configured to produce a reference laser beam; a first laser source configured to produce a first laser beam; a second laser source configured to produce a second laser beam; a sensing resonator coupled to the first and second laser sources such that the first and second laser beams propagate through the sensing resonator in first and second directions, respectively; resonance tracking electronics configured to generate first and second control signals that indicate when the first and second laser beams, respectively, are off resonance; first and second optical combiners configured to beat the first and second outputs of the sensing resonator with the reference laser beam creating first and second beat signals, respectively; wherein the resonance tracking electronics is configured to discriminate between at least one rotation-sensing error and the first and second outputs of the resonator based on the first and second beat signals.

20 Claims, 5 Drawing Sheets

U.S. PATENT DOCUMENTS

| | | | |
|---|---|---|---|
| 5,325,174 A | 6/1994 | Danko | |
| 5,349,441 A | 9/1994 | Sanders | |
| 5,384,637 A | 1/1995 | Sanders et al. | |
| 5,459,575 A | 10/1995 | Malvern | |
| 5,465,149 A | 11/1995 | Strandjord et al. | |
| 5,469,257 A | 11/1995 | Blake et al. | |
| 5,493,623 A | 2/1996 | Frische et al. | |
| 5,526,451 A | 6/1996 | Cahill et al. | |
| 5,610,714 A | 3/1997 | Malvern | |
| 5,734,469 A | 3/1998 | Strandjord | |
| 5,767,968 A | 6/1998 | Strandjord | |
| 5,781,300 A | 7/1998 | Strandjord et al. | |
| 5,926,275 A | 7/1999 | Sanders et al. | |
| 6,014,217 A | 1/2000 | Sanders et al. | |
| 6,204,921 B1 | 3/2001 | Strandjord et al. | |
| 6,539,155 B1 | 3/2003 | Broeng | |
| 6,765,678 B2 | 7/2004 | Strandjord et al. | |
| 7,038,783 B2 | 5/2006 | Standjord et al. | |
| 7,123,800 B2 | 10/2006 | Kaplan | |
| 7,231,103 B2 | 6/2007 | Yamashita | |
| 7,245,381 B2 | 7/2007 | Marino | |
| 7,372,574 B2 | 5/2008 | Sanders et al. | |
| 7,388,671 B2 | 6/2008 | Sanders et al. | |
| 7,463,360 B2 | 12/2008 | Hughes et al. | |
| 7,522,284 B2 | 4/2009 | Sanders et al. | |
| 7,751,055 B2 | 7/2010 | Sanders et al. | |
| 7,802,928 B2 | 9/2010 | Strabley et al. | |
| 7,848,601 B2 | 12/2010 | Carothers | |
| 7,855,789 B2 | 12/2010 | Strandjord | |
| 7,864,328 B2 | 1/2011 | Strandjord | |
| 7,869,052 B2 | 1/2011 | Strandjord | |
| 7,933,020 B1* | 4/2011 | Strandjord et al. | 356/461 |
| 8,009,296 B2* | 8/2011 | Sanders et al. | 356/461 |
| 2002/0044737 A1 | 4/2002 | Hung | |
| 2003/0169428 A1 | 9/2003 | Lange | |
| 2004/0061863 A1 | 4/2004 | Digonnet | |
| 2004/0263856 A1 | 12/2004 | Willig et al. | |
| 2007/0097374 A1 | 5/2007 | Ren-Young | |
| 2007/0133003 A1 | 6/2007 | Sanders | |
| 2007/0242276 A1 | 10/2007 | Hughes | |
| 2008/0079946 A1 | 4/2008 | Greening | |
| 2010/0002239 A1 | 1/2010 | Strandjord et al. | |
| 2010/0225922 A1 | 9/2010 | Strandjord | |
| 2010/0225923 A1 | 9/2010 | Strandjord et al. | |
| 2010/0253948 A1 | 10/2010 | Strandjord et al. | |
| 2011/0181886 A1 | 7/2011 | Strandjord et al. | |
| 2011/0181887 A1 | 7/2011 | Tarleton et al. | |
| 2011/0292396 A1* | 12/2011 | Strandjord et al. | 356/461 |

FOREIGN PATENT DOCUMENTS

| | | |
|---|---|---|
| EP | 1391693 | 2/2004 |

OTHER PUBLICATIONS

Carroll, "Backscatter and the Resonant Fiber-Optic Gyro Scale Factor", "Journal of Lightwave Technology", Dec. 1989, pp. 1895-1900, vol. 7, No. 12, Publisher: IEEE.

Carroll, "The Passive Resonator Fiber Optic Gyro and Comparison to the Interferometer Fiber Gyro", "Fiber Optic Gyros 10th Anniversary Conference", 1986, pp. 486-494, vol. 719, 169, 177, Publisher: SPIE.

Chen et al, "Highly birefringent hollow-core photonic bandgap fiber", "Optics Express 3888", Aug. 9, 2004, pp. 3888-3893, vol. 12, No. 16, Publisher: Optical Society of America.

R.F. Cregan et al., "Single-Mode Photonic Band Gap Guidance of Light in Air", Sep. 3, 1999, pp. 1537-1539, vol. 285, Published in: US.

Ezekiel, "Passive Ring Resonator Laser Gyroscope", "Applied Physics Letters", May 1, 1977, pp. 478-480, vol. 30, No. 9, Publisher: American Institute of Physics.

Hansen et al., "Air-Guiding Photoni Bandgap Fibers: Spectral Properties, Macrobending Loss, and Practical Handling", "Journal of Lightwave Technology", Jan. 2004, pp. 11-13, vol. 22, No. 1, Publisher: IEEE.

Hotate et al., "Resonator Fiber Optic Gyro Using Digital Serrodyne Modulation-Method to Reduce the Noise Induced by the Backscattering a", "13th International Conference on Optical Fiber Sensors", Apr. 12-16, 1999, pp. 104-107, vol. 3746, Publisher: SPIEE.

Hotate, "Drift Reduction in an Optical Passive Ring-Resonator Gyro", "Fiber Optic Gyros: 15th Anniversary Conference", 1991, pp. 116-127, vol. 1585, Publisher: SPIE.

Hotate, "Adjustment-Free Method to Eliminate the Noise Induced by the Backscattering in an Optical Passive Ring-Resonator Gyro", "IEEE Photonics Technology Letters", Jan. 1990, pp. 75-77, vol. 2, No. 1, Publisher: IEEE.

Iwatsuki, "Effect of Rayleigh Backscattering in an Optical Passive Ring-Resonator Gyro", "Applied Optics", Nov. 1, 1984, pp. 3916-3924, vol. 23, No. 21, Publisher: Optical Society of America.

Kaiser, "Experimental Developments in the RFOG", "Fiber Optic and Laser Sensors VIII", 1990, pp. 121-126, vol. 1367, Publisher: SPIE.

Mangan et al., "Low Loss (1.7dB/km) Hollow Core Photonic Bandgap Fiber", 2004, pp. 1-3, Publisher: Optical Society of America.

Rakhmanov, "Demodulation of Intensity and Shot Noise in the Optical Heterodyne Detection of Laser Interferometers for Gravitional WA", "Applied Optics", Dec. 20, 2001, pp. 6596-6605, vol. 40, No. 36.

Sanders, Glen, "Critical Review of Resonator Fiber Optic Gyroscope Technology", "Proc. SPIE Fiber Optic and Laser Sensors X", Sep. 1992, pp. 133-159, vol. CF44, Publisher: SPIEE, Published in: Boston, MA.

Sanders et al., "Passive Ring Resonator Method for Sensitive Inertial Rotation Measurements in Geophysics and Relativity", "Optics Letter", Nov. 1981, pp. 569-571, vol. 6, No. 11, Publisher: Optical Society of America.

Sanders et al., "Novel Polarization-rotating Fiber Resonator for Rotation Sensing Applications", "Fiber Optic and Laser Sensors VII", 1989, pp. 373-381, vol. 1169, Publisher: Proc. SPIE.

Sanders et el., "Fiber Optic Gyro Technology Trends—A Honeywell Perspective", "Optical Fiber Sensors Conference Technical Digest", 2002, pp. 5-8, vol. 1, Publisher: IEEE.

Smith et al., "Recent Developments in Fiberoptic Ring Laser Gyros", "Fiber Optic and Laser Sensors VIII", 1990, pp. 103-106, vol. 1367, Publisher: SPIE.

Strandjord et al., "Performance Improvements of a Polarization-Rotating Resonator Fiber Optic Gyroscope", "Fiber Optic and Laser Sensors X", 1992, pp. 94-104, vol. 1795, Publisher: SPIE.

Suzuki et al., "Reduction of Backscattering Induced Noise by Ternary Phase Shift Keying in Monolithically Integrated Micro Optic Gyro on", "13th International Conference on Optical Fiber Sensors", Apr. 12-16, 1999, pp. 78-81, vol. 3746, Publisher: SPIE.

Strandjord, "Title: Method and Amplifying Stage for Suppressing Modulation Distortion Rate Sensing Errors in a Resonator Fiber Optic Gyroscope ", Filed on: Jun. 5, 2009, U.S. Appl. No. 12/479,609.

Strandjord, "Title: Cavity Length Modulation in Resonator Fiber Optic Gyroscopes", Filed on: Sep. 23, 2009, U.S. Appl. No. 12/565,510.

Strandjord, "Title: System and Method for Reducing Laser Phase Noise in a Resonator Fiber Optic Gyroscope", Filed on: Dec. 13, 2009, U.S. Appl. No. 12/636,741.

Strandjord, "Title: System and Method for Enhancing Signal-To-Noise Ratio of a Resonator Fiber Optic Gyroscope", Filed on: May 28, 2010, U.S. Appl. No. 12/789,972.

* cited by examiner

RFOG WITH OPTICAL HETERODYNING FOR OPTICAL SIGNAL DISCRIMINATION

CROSS-REFERENCE TO RELATED APPLICATIONS

This application is related to co-pending U.S. patent application Ser. No. 12/789,972 entitled "SYSTEM AND METHOD FOR ENHANCING SIGNAL-TO-NOISE RATIO OF A RESONATOR FIBER OPTIC GYROSCOPE" filed on May 28, 2010, herein incorporated in its entirety by reference and referred to herein as the '972 application.

BACKGROUND

Gyroscopes (also referred to herein as gyros) have been used to measure rotation rates or changes in angular velocity about an axis of rotation. A basic conventional fiber-optic gyro (FOG) includes a light source, a beam-generating device, and a coil of optical fiber coupled to the beam generating device that encircles an area. The beam-generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate that is normal to the enclosed area.

In a conventional resonator FOG (RFOG), the counter-propagating light beams are typically monochromatic (e.g., in a single frequency) and circulate through multiple turns of the fiber-optic coil and for multiple passes through the coil using a device, such as a fiber coupler, that redirects light that has passed through the coil back into the coil again (i.e., circulates the light). The beam-generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength λ is referred to as "on resonance" when the round trip resonator pathlength is equal to an integral number of wavelengths. A rotation about the axis of the coil produces a different pathlength for clockwise and counterclockwise propagation, thus producing a shift between the respective resonance frequencies of the resonator. The frequency difference, such as may be measured by tuning the CW beam and CCW beam frequencies to match the resonance frequency shift of the closed optical path due to rotation, indicates the rotation rate.

However, the modulation of the light beam also has imperfections associated with it. There are at least two types of modulator imperfections that can result in rotation-sensing errors. One type is modulator intensity modulation. Even though the intended modulation is either cavity length, optical frequency or optical phase, a non-ideal modulator will also generate a modulation of the light intensity which can have a component at the modulation frequency. The unwanted intensity modulation will be detected by the demodulator and interpreted as a signal indicating an off resonance condition. Resonator tracking electronics will then move the laser frequency away from the resonance frequency until the normal resonator intensity signal exactly cancels out the unwanted intensity signal. The deviation away from the resonance frequency results in a rotation sensing error if the unwanted intensity signals are different between the two counter-propagating light waves.

Another modulator imperfection that can result in rotation-sensing errors is modulation distortion. Modulation distortion can occur at the modulator drive electronics or the modulator. An ideal modulation is a sinusoidal modulation at a single frequency. However, distortion can result in the generation of higher harmonics on the modulation. Even harmonic modulation will result in a resonance detection error which can lead to a rotation sensing error.

SUMMARY

In one embodiment, a resonator fiber-optic gyro (RFOG) is provided. The RFOG comprises a reference laser configured to produce a reference laser beam having a reference frequency; a first laser source configured to produce a first laser beam having a first frequency offset from the reference laser beam; a second laser source configured to produce a second laser beam having a second frequency offset from the reference laser beam; a sensing resonator having a first input coupled to the first laser source and a second input coupled to the second laser source such that the first laser beam propagates through the sensing resonator in a first direction and exits at a first output and the second laser beam propagates through the sensing resonator in a second direction and exits at a second output; resonance tracking electronics configured to generate a first control signal that indicates when the first laser beam is off resonance and to generate a second control signal that indicates when the second laser beam is off resonance; a first optical combiner coupled between a first output of the sensing resonator and a first input of the resonance tracking electronics, the first optical combiner configured to beat the first output of the sensing resonator with the reference laser beam creating a first beat signal; wherein the resonance tracking electronics is configured to discriminate between the first output of the resonator and at least one rotation-sensing error based on the first beat signal; and a second optical combiner coupled between a second output of the sensing resonator and a second input of the resonance tracking electronics, the second optical combiner configured to beat the second output of the sensing resonator with the reference laser beam creating a second beat signal; wherein the resonance tracking electronics is configured to discriminate between the second output of the resonator and at least one rotation-sensing error based on the second beat signal.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
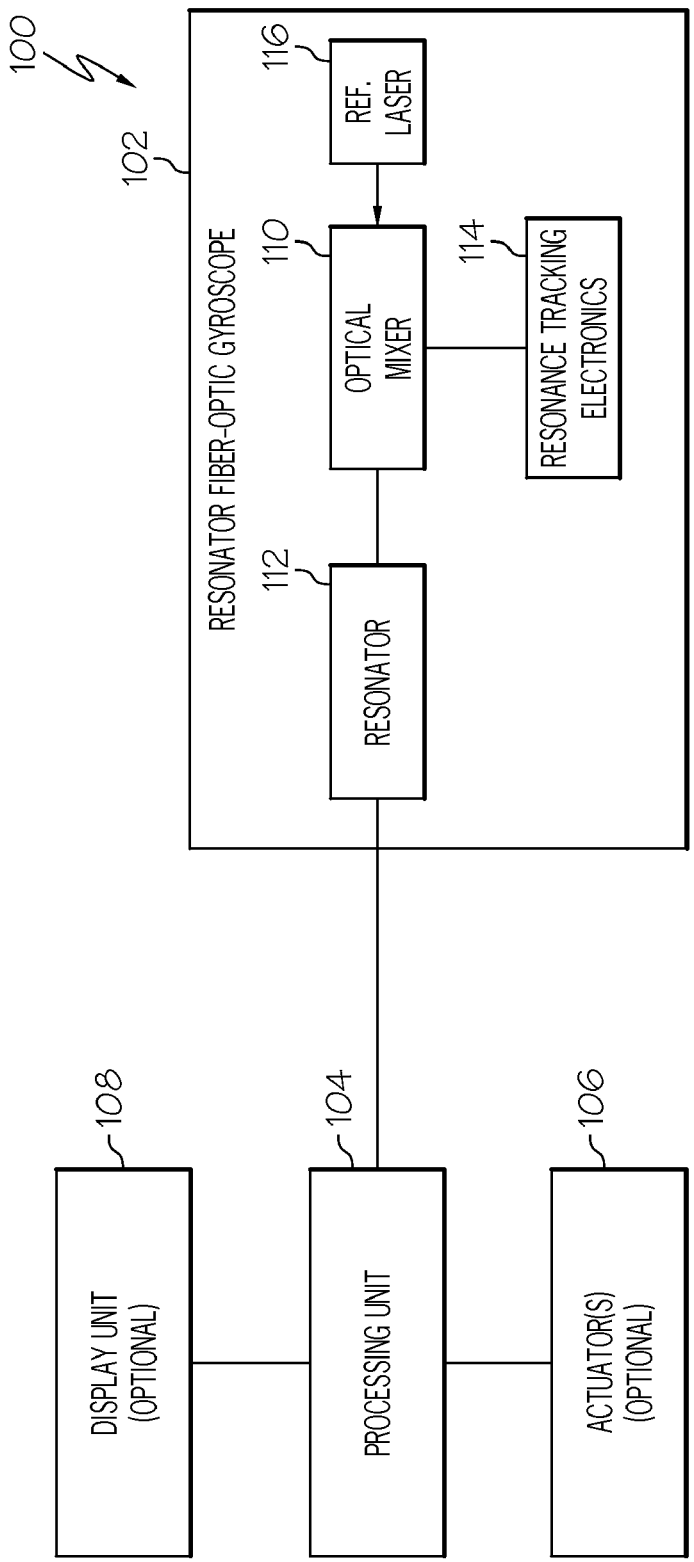
FIG. 1 is a block diagram of one embodiment of a system utilizing a RFOG.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments. However, it is to be understood that other embodiments may be utilized and that logical, mechanical and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a system 100 utilizing a RFOG 102. The system 100 is a navigation system in this embodiment. However, it is understood that, in other embodiments resonator fiber-optic gyroscope (RFOG) 102 can be used in other systems, such as, but not limited to, a platform stabilization system or a pointing system. For example, in some embodiments, the RFOG 102 is implemented as part of an inertial sensor unit that includes one or more RFOGs and one or more linear accelerometers. The RFOG 102 measures rotation rate and outputs a signal indicative of rotation rate to a processing unit 104. The processing unit 104 uses the measured rotation rate from the RFOG 102 to calculate parameters such as position, orientation, and angular velocity.

The processing unit 104 uses the calculated parameters, in some embodiments, to calculate control signals that are outputted to one or more optional actuators 106. For example, in some embodiments, the navigation system 100 is implemented in an unmanned vehicle. Hence, the actuators 106 are implemented according to the vehicle type. For example, in an unmanned aerial vehicle, the actuators 106 are implemented as wing flaps, thrusters, etc.

Additionally, in some embodiments, the processing unit 104 outputs the calculated parameters to an optional display unit 108. For example, in some embodiments, the display unit 108 displays the geographic location, velocity, and/or orientation (e.g. pitch, roll, and/or yaw) of a vehicle in which the RFOG 102 is located. The display unit 108 can be implemented as any suitable display unit such as, but not limited to, various CRT, active and passive matrix LCD, and plasma display units.

The RFOG 102 is configured for improved error correction of rotation sensing errors. In particular, the RFOG 102 includes an optical mixer 110 coupled between an output of a resonator 112 and an input of a resonance tracking electronics 114. The optical mixer 110 optically mixes a reference laser 116 with the output of the resonator 112 to create a beat signal. In particular, the resonance tracking electronics 114 can then discriminate between rotational information and rotation-sensing errors by distinguishing between the beat frequencies of the beat signal.

Figure 2:
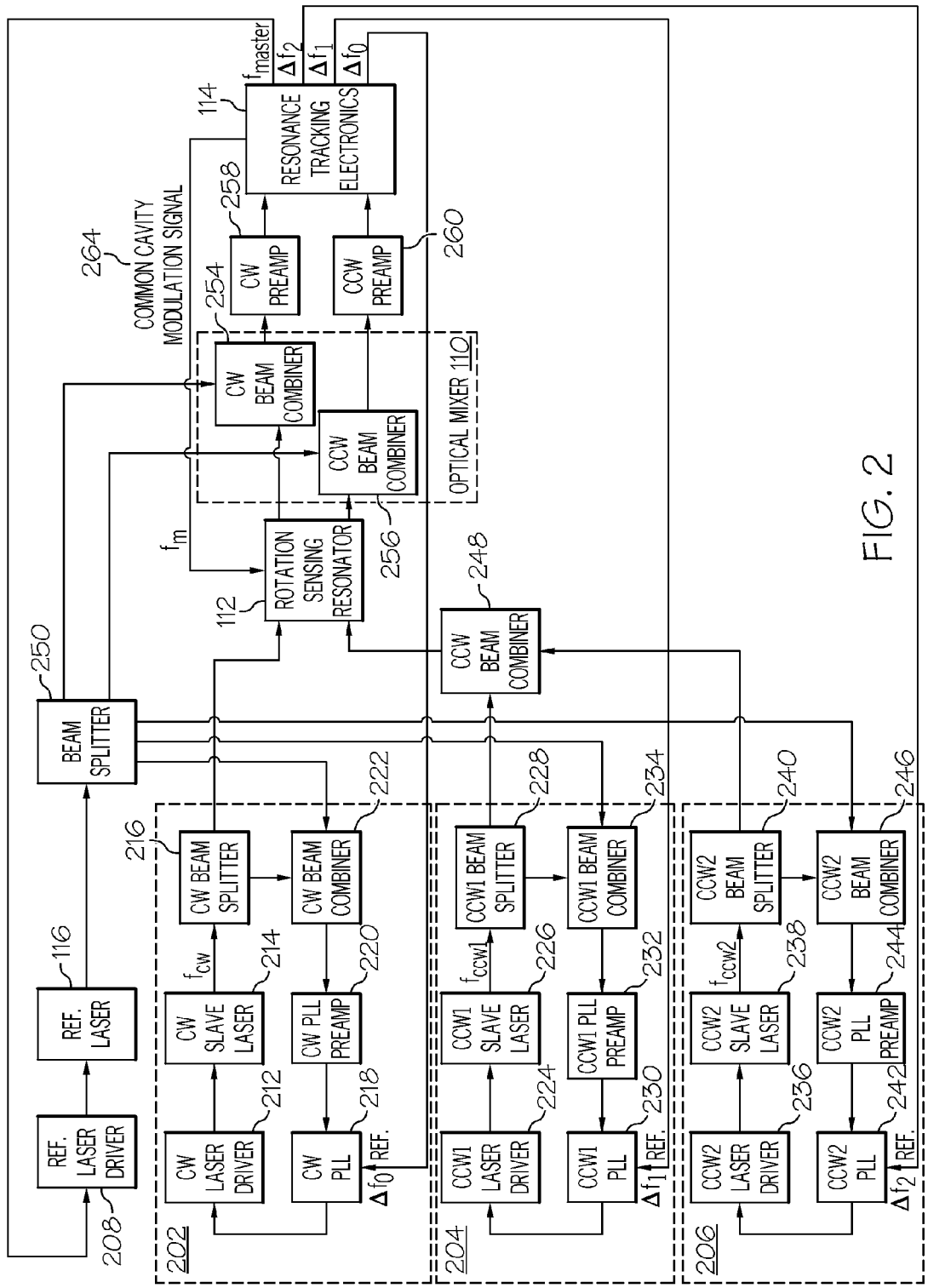
FIG. 2 is a block diagram of one exemplary embodiment of a RFOG.

FIG. 2 is a block diagram of one exemplary embodiment of a RFOG 102. RFOG 102 includes the optical mixer 110 between the output of the rotation-sensing resonator 112 and the resonance tracking electronics 114. In particular, as shown in FIG. 2, optical mixer 110 includes a clockwise (CW) beam combiner 254 coupled between a first output of the resonator 112 and the resonance tracking electronics 114, and a counter-clockwise (CCW) beam combiner 256 coupled between a second output of the resonator 112 and the resonance tracking electronics 114.

The RFOG 102 also includes a reference laser source 116, a first laser source 202, a second laser source 204, and a third laser source 206. The reference laser source 116 creates a laser beam with a constant frequency $f_{ref}$ that a beam splitter 250 splits into five beams. A first beam goes to a CW beam combiner 222, a second beam goes to a first CCW (CCW1) beam combiner 234, a third beam goes to a second CCW (CCW2) beam combiner 246, a fourth beam goes to a CW beam combiner 254, and a fifth beam goes to a CCW beam combiner 256.

In this embodiment, the first laser source 202 comprises a CW laser driver 212, a CW slave laser 214, a CW beam combiner 222, a CW phase-lock-loop (PLL) preamp 220, and a CW phase-lock-loop (PLL) 218. The CW beam splitter 216 splits the CW slave laser 214 beam into two beams. One laser beam propagates through the rotation-sensing resonator 112 in a clockwise direction and the other goes to a CW beam combiner 222. CW beam combiner 222 optically mixes the reference laser 116 with CW slave laser 214. The optical mixing creates an intensity signal at the output of the CW beam combiner 222. The frequency of the intensity signal is the beat frequency between the CW slave laser 214 and reference laser 116. The CW PLL preamp 220 converts this intensity signal into an electrical signal. The CW PLL 218 locks the frequency of the CW slave laser 214 to the reference laser 116 with an additional CW frequency offset $\Delta f_0$ provided as a reference signal. The resonance tracking electronics 114 generate electronically the CW frequency offset reference $\Delta f_0$. The CW PLL 218 controls the CW laser frequency via the CW laser driver 212 in a feedback loop to maintain the beat signal of the CW frequency offset $\Delta f_0$ between the CW slave laser 214 and reference laser 116.

The CW slave laser 214 is locked onto a resonance frequency of the resonator 112. To determine the center of the CW resonance frequency, the CW slave laser 214 is modulated using a resonance tracking modulation frequency. In some embodiments, a separate modulation frequency is used for each laser beam traveling through the resonator. In other embodiments, a single common-cavity modulation frequency is used as the resonance tracking modulation frequency for each laser beam traveling through the resonator. Common-cavity modulation is a type of modulation that uses a common resonance tracking modulation frequency signal ($f_m$) for all light beams that travel through the resonator. For example, this can be done by using the same modulator for both counter-propagating light waves located in the resonator cavity. By using the same modulator, the resonance detection errors are the same for both the clockwise and counterclockwise directions. Since the rotation measurement is the difference between the detected clockwise and counterclockwise resonance frequencies, a common error will cancel out (common mode rejection) in the rotation measurement. The embodiments described herein, enable the use of common-cavity modulation to reduce or eliminate rotation-sensing errors due to modulator imperfections. In particular, as described in more detail below, the optical mixer 110 and the resonance tracking electronics 114 are configured to reduce or eliminate errors associated with common-cavity modulation, such as errors due to backscattered waves.

Because of the modulation, the CW output of the rotation-sensing resonator 112 is a signal that is indicative of the frequency difference between the CW laser 214 frequency and the center frequency of the CW resonance frequency. The signal at the modulation frequency will pass through zero amplitude when the CW slave laser 214 frequency is at the resonance frequency. The resonance tracking electronics 114, as explained in detail below, demodulates the resonator CW output signal at the resonance tracking modulation frequency ($f_m$) and generates a control signal $\Delta f_0$ that indicates the frequency offset to control the CW slave laser 214 to on-resonance. The resonance tracking electronics 114 outputs the control signal to the CW PLL 218 as a reference frequency. Thus, the resonance tracking electronics 114 can maintain the CW slave laser 214 on-resonance by controlling the CW frequency offset $\Delta f_0$.

A second laser source 204 and a third laser source 206 are configured similarly to the first laser source 202. Both the second laser source 204 and the third laser source 206 use a phase lock loop (e.g. a CCW1 PLL 230 and a CCW2 PLL 242) to lock the respective laser source to a frequency offset from the reference laser 116. Likewise, the resonance tracking electronics 114 generate electronically the frequency offsets. In the case of a CCW1 slave laser 226 the frequency offset is $\Delta f_1$ and for a CCW2 slave laser 238 the frequency offset is $\Delta f_2$. The frequency of the CCW1 slave laser 226 is set to at least one free spectral range below the frequency of the CW slave laser 214. The frequency of the CCW2 slave laser 226 is set to at least one free spectral range above the frequency of CW slave laser 214. Furthermore, similar to the first laser source 202, modulation is used, for example common-cavity modulation, to control the second laser source 204 and the third laser source 206 to on-resonance. A CCW beam combiner 248 combines the beams of CCW1 slave laser 226 and CCW2 slave laser 238. The output of the CCW beam combiner 248 then propagates through the rotation-sensing resonator 112 in the counter-clockwise direction.

The output of rotation-sensing resonator 112 is modified in order to improve error-correction of rotation-sensing error. In particular, a CW beam combiner 254 and a CCW beam combiner 256 optically mix the reference laser 116 with the respective optical output signals of the resonator 112. Thus, the CW beam combiner 254 and the CCW beam combiner 256 create an intensity modulation wherein the frequency of the intensity signals are the beat frequencies between the reference laser 116 and the optical output signals of the resonator 112. This allows for discrimination between signals carrying rotation rate information and rotation-sensing errors. It is understood that the CW beam combiner 254 and the CCW beam combiner 256 operate in a similar fashion. For example, assuming there are no rotation-sensing errors, the approximate expected output of the CW beam combiner 254 is $\Delta f_0$ since that is the beat frequency between the CW slave laser 214 and the reference laser 116. However, for example, due to errors such as optical backscatter some of the light from CCW1 slave laser 226, locked to a beat frequency of $\Delta f_1$ with the master laser 116, back reflects into the same path of the light of CW slave laser 214 in the resonator 112. The back-reflected light will undergo a different path than the CW light and therefore may appear to be off resonance, thus generating a false error signal at the resonance tracking modulation frequency. However, since the optical mixer 110 mixes the resonator output light with a beam from the reference laser 116, the backscatter light will mix with the reference beam which will modulate the backscatter light at $\Delta f_1$, whereas the CW beam will mix with the reference beam which modulates the CW light at $\Delta f_0$. The resonance tracking electronics 114 can be configured to filter the unwanted signal ($\Delta f_1$) by demodulating the output signal of the CW beam combiner 254 at $\Delta f_0$ using lock-in detection (synchronous demodulation).

In one embodiment, the resonance tracking electronics 114 is further configured to produce a common-cavity modulation signal 264 ($f_m$). Common-cavity modulation signal 264 is a sinusoidal voltage signal that drives a piezo-electric transducer tube (PZT). At least some of the optical fiber of the resonator is wrapped around the PZT. The PZT is configured so that the sinusoidal voltage signal drives the PZT to create a common modulation signal on both light beams. As explained above, the common-cavity modulation is used to control the laser beams on-resonance. However, since a common modulation scheme is used for all light beams it allows for common mode rejection of additional rotation-sensing errors, thereby reducing the complexity of the RFOG 102.

Although three slave lasers are described in this exemplary embodiments, it is to be understood that other embodiments are not to be so limited. For example, in another exemplary embodiment two slave lasers locked to a frequency offset from a reference laser 116 are used. A first slave laser produces a CW beam that is tuned to a resonance frequency of the CW direction of the resonator. A second slave laser process a CCW beam that is tuned to a resonance frequency of the CCW direction on a different resonance mode than the CW beam. In some such embodiments, the CCW beam is switched between a CCW resonance frequency that is at least one longitudinal resonance mode lower than the resonance frequency of the CW direction and a CCW resonance frequency that is at least one longitudinal resonance mode higher than the resonance frequency of the CW direction.

In one embodiment using two slave lasers, common-cavity modulation is used to control the laser beams to on-resonance. In another embodiment, each beam is modulated separately. The rotation-sensing electronics 114 is configured to discriminate between rotation-sensing errors and the rotation rate information by using the optical mixer 110 to create a beat signal.

Figure 3:
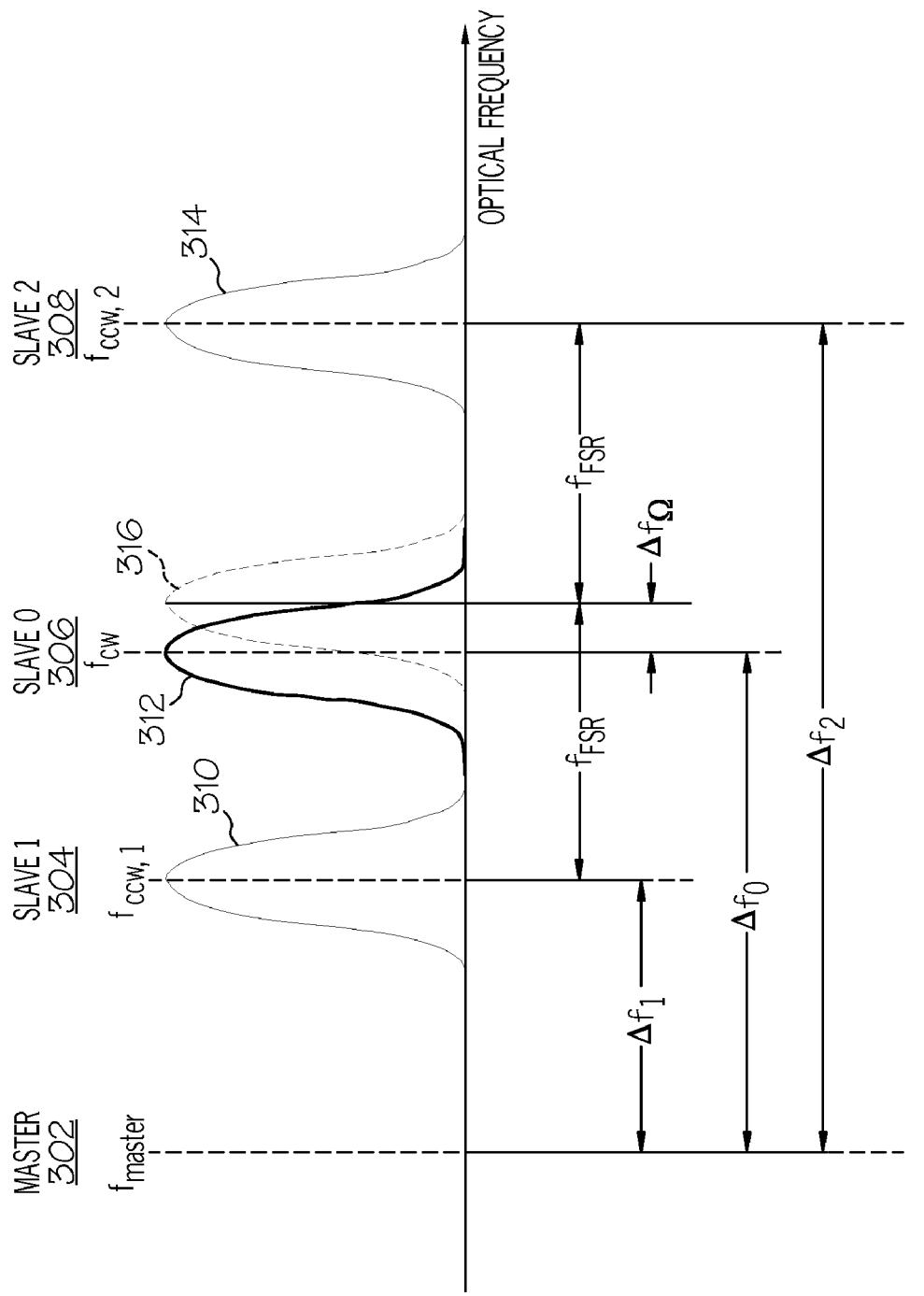
FIG. 3 is a graph of an exemplary master laser waveform and exemplary slave laser waveforms.

FIG. 3 depicts a graph of an exemplary master laser waveform 302, a slave 0 laser waveform 302, a slave 1 laser waveform 304, a slave 2 laser waveform 308. Master waveform 302 corresponds to the reference laser 116 and provides a stable optical frequency reference. The master waveform 302 does not go through the gyro resonator. Slave 0 waveform 306 corresponds to the CW slave laser 214 and is locked to a frequency offset $\Delta f_0$ from the master waveform 302. Slave 1 waveform 304 corresponds to the CCW1 slave laser 226 and is locked to a frequency offset $\Delta f_1$ from master waveform 302, which is at least one free-spectral range (e.g one resonance mode at zero rotation rate) below Slave 0. Slave 2 waveform 308 corresponds to the CCW2 slave laser 238 and is located at a frequency offset $\Delta f_2$ from master waveform 302, which is at least one free-spectral range (e.g one resonance mode at zero rotation rate) above Slave 0. Peaks 310 and 314 are the sensing coil resonance peaks corresponding to the CCW1 and CCW2 slave lasers, respectively. Peak 312 is the sensing coil resonance peak corresponding to the CW slave laser. Peak 316 corresponds to a resonance peak at a resonance mode between the resonance modes of the CCW1 and CCW2 slave lasers. The formula for calculating rotational rate is $2\Delta f_\Omega = (\Delta f_2 - \Delta f_0) - (\Delta f_0 - \Delta f_1)$ where $\Delta f_\Omega$ is proportional to rotation rate. Thus, by subtracting the beat frequencies, as described above, an output value is produced that is about two times the $\Delta f_\Omega$.

Figure 4:
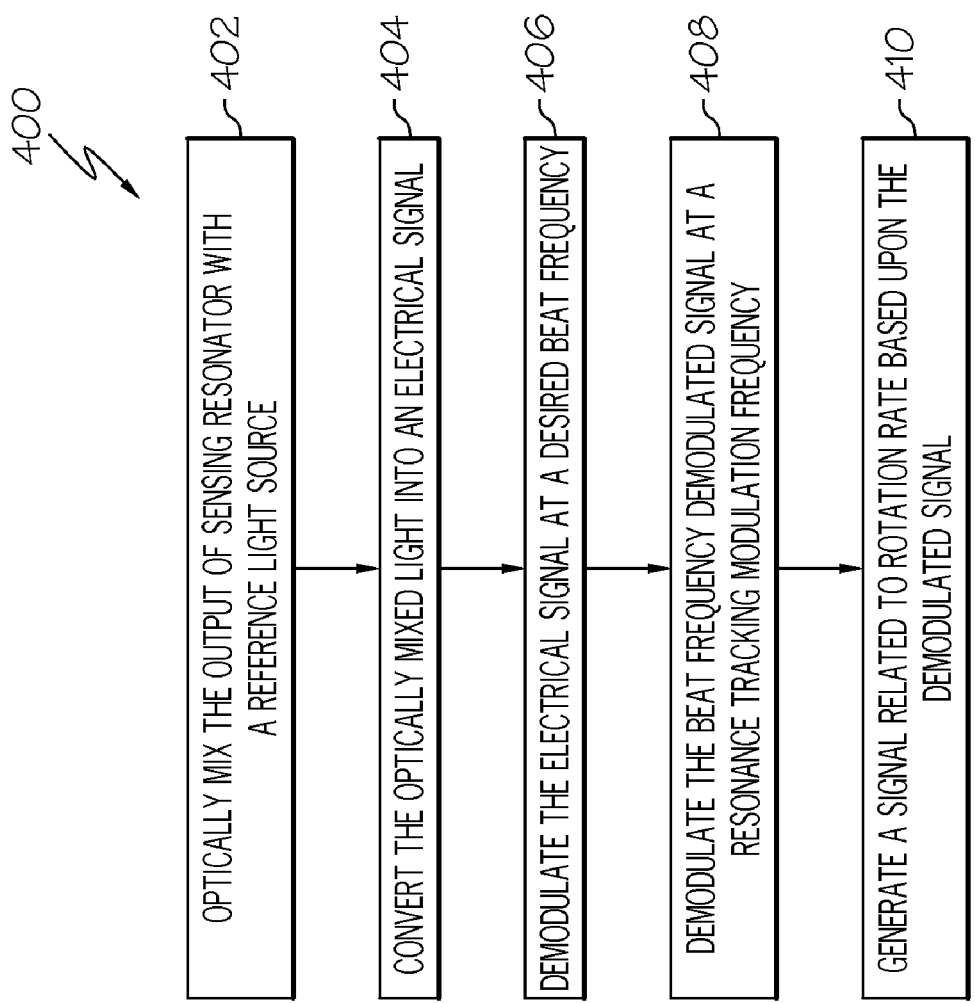
FIG. 4 is a flow chart of one embodiment of a method of reducing rotation-sensing error in a resonator fiber-optic gyroscope.

FIG. 4 is a flow chart of one embodiment of a method 400 of reducing rotation-sensing error in a resonator fiber-optic gyroscope. At block 402, method 400 optically mixes output of a resonator, such as resonator 112, with a reference laser, such as reference laser 116. This has the effect of creating beat signals between the optical output of the resonator and the reference laser. For example, if a CW output of the resonator 112 contains a CW beam at a 50 MHz offset and a back-reflected CCW beam at a 51 MHz offset from the reference laser 116, the mixing of the output with the reference laser 116 creates two beat frequencies at 50 mhz and 51 mhz, respectively. Next, at block 404, method 400 converts the beat signal into an electric signal. In one embodiment, a sensor such as CW preamp 258 or CCW preamp 260 converts the optical signal to an electric signal.

At block 406, the beat signal is demodulated at a desired frequency using, for example, lock-detection (synchronous demodulation). For example, if the output being demodulated is a CW beam locked to a 50 MHz offset from the reference laser 116, the output is demodulated at 50 MHz, thereby reducing other undesired components such as back-reflected light at other frequencies. At block 408, the signal is demodulated a second time at the resonance tracking modulation frequency. In one embodiment, the resonance tracking modulation frequency is different for each laser beam. In another embodiment, a common resonance tracking modulation frequency is used for all lasers. At block 410, based upon the demodulated output, rotation rate information is determined, for example by the resonance tracking electronics 114, and a signal is generated which relates to the rotational rate. Although for this illustrative embodiment the steps of method 400 have been described in a certain order, the present invention is not intended to be so limited and can include variations in the order of the steps, except where explicitly limited in the method.

Figure 5:
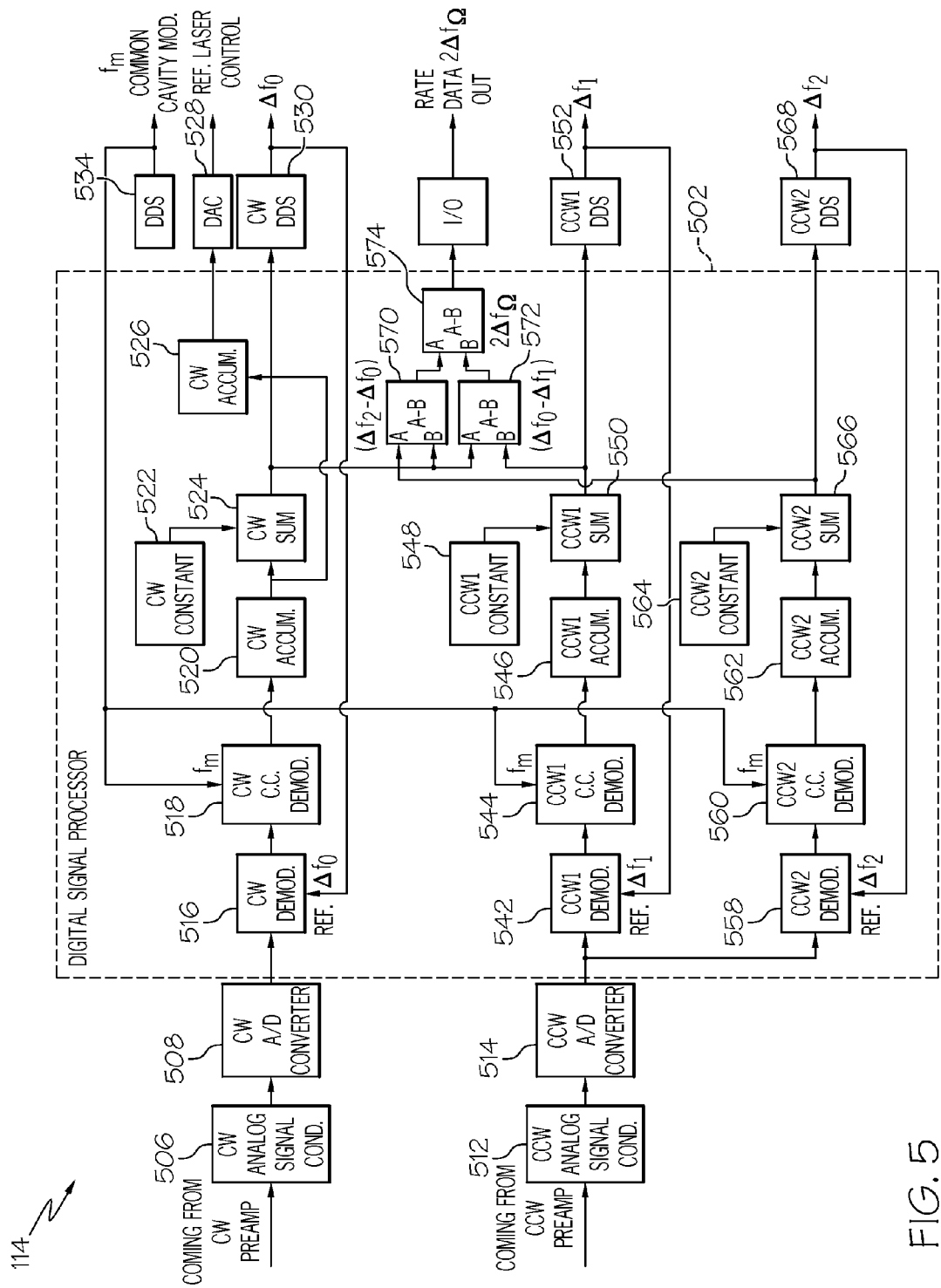
FIG. 5 is a block diagram of one embodiment of an exemplary resonance tracking electronics configured to reduce rotation-sensing errors.

FIG. 5 is a block diagram of one embodiment of an exemplary resonance tracking electronics 114 configured to reduce rotation-sensing errors. Resonance tracking electronics 114 comprises a digital signal processor 502, a CW analog signal conditioner 506, a CW analog-to-digital converter 508, a CCW analog signal conditioner 512, and a CCW analog-to-digital converter 514. The CW analog signal conditioner 506 and the CCW analog signal conditioner 512 both provide signal conditioning on the output from the respective preamp, such as CW preamp 258 or CCW preamp 260. For example, the CW analog signal conditioner 506 may include filtering of unwanted signals to allow further analog gain without saturating electronics and anti-aliasing filtering before being digitalized by the CW analog-to-digital converter 508. In another embodiment, there is an intermediate frequency (IF) stage, where the output of preamp (e.g. CW preamp 258 or CCW preamp 260) is down converted to an intermediate frequency before being digitalized by the respective analog to digital converter (e.g. CW analog-to-digital converter 508 or CCW analog-to-digital converter 514). In one implementation of this embodiment, the down conversion occurs in the CW analog signal conditioner 506 or the CCW analog signal conditioner 512, respectively. After the analog-to-digital converters (e.g. CW analog-to-digital converter 508 or CCW analog to digital converter 514) digitalize the signal, it is inputted to the digital signal processor 502. The digital signal processor 502 can be implemented, for example, as a field programmable array (FPGA) chip, an application specific integrated circuit (ASIC), or a microprocessor.

Digital signal processor 502 processes the digital signals originating from the CW preamp 258 and the CCW preamp 260. The CW signal is demodulated at a CW demodulator 516 with a reference signal at the CW frequency offset ($\Delta f_0$) using, for example, lock-in detection (synchronous demodulation). This allows for the discrimination between rotation information and rotation-sensing errors using the beat frequencies generated from optical mixer 110. After the rotation-sensing errors have been discriminated or blocked by the CW demodulator 516, the demodulated signal output from the CW demodulator 516 is demodulated a second time at a CW common-cavity (C.C.) demodulator 518. The CW C.C. demodulator 518 demodulates the output of the CW demodulator 516 using a reference signal at the common resonance tracking modulation frequency, $f_m$.

The output of the CW C.C. demodulator 518 indicates whether the CW slave laser 214 is on-resonance or off resonance. On-resonance refers to a particular light beam (e.g. CW slave laser 214) having a round trip resonator path length equal to an integral number of wavelengths. Similarly, a light beam is off-resonance when its round trip resonator path length is not equal to the same integral number of wavelengths. When all beams are approximately on-resonance, the rotational rate information can be determined. In one embodiment, if the output of the CW C.C. 518 is zero, then the CW slave laser 214 is on-resonance. If the output of CW C.C. 518 has a non-zero value, the CW slave laser 214 is off resonance. A non-zero output is a referred to as an error signal, and can be used in a control loop, as described in detail below, to adjust the light beams to on-resonance.

The output of the CW C.C. 518 is integrated in a first CW accumulator 520. The output of accumulator 520 is coupled to a CW summer 524 and to a second CW accumulator 526. The second CW accumulator 526 is coupled to a digital-to-analog converter 528, which is used to drive the reference laser driver 116. In particular, the accumulator 526 controls the reference laser frequency to keep all the lasers and electronics within normal operating range. For example, the accumulator 526 controls the reference laser frequency to keep the time-average value of accumulator 520 near zero in order to prevent the beat frequencies between the reference and slave lasers from exceeding the operating range of the electronics.

The CW summer 524 sums the output of the CW accumulator 520 with a CW constant 522. In one embodiment, CW constant 522 is a nominal value that when the output of the CW C.C. demodulator 518 is zero causes the CW slave laser 214 to operate approximately on-resonance. The output of the CW summer 524 is coupled to a second input of a first subtractor 570, a first input of a second subtractor 572, and as a reference frequency to a CW direct digital synthesizer chip 530 (DDS). The output of CW DDS 530 is the new $\Delta f_0$, which is calculated from the error signal to control the CW slave laser 214 to on-resonance. This is fed as a reference signal to the CW PLL 218 and to the CW demodulator 516. Additionally, a DDS 534 outputs the common cavity modulation signal to a modulator in the resonator 112.

The digital signal processor 502 processes a first CCW slave laser (CCW1) 228 and a second CCW slave laser (CCW2) 238 in similar manners to the CW slave laser 214. Using a similar process as described above, a CCW1 demodulator 542 and a CCW2 demodulator 558, in this example, use lock-in detection to discriminate between different signals. However, in this case, not only does the CCW1 demodulator 542 discriminate out rotation-sensing errors, but it also removes the CCW2 slave laser 238, leaving the CCW1 slave laser 228. Similarly, the CCW2 demodulator 558 removes the CCW1 slave laser 228, leaving the CCW2 slave laser 238. Furthermore, the output of a CCW1 DDS 552 and a CCW2 DDS 568 is $\Delta f_1$ and $\Delta f_2$, respectively. These are fed as reference signals to the CCW1 demodulator 542 and the CCW2 demodulator 558, respectively. In addition, $\Delta f_1$ and $\Delta f_2$ are fed as reference signals to the CCW1 PLL 230 and the CCW2 PLL 242, respectively, to bring the beams on-resonance. The output of a CCW1 summer 550 is coupled to a second input of the second subtractor 572 and the output of the CCW2 summer 566 is coupled to a first input of the first subtractor 570.

In one embodiment, subtractor 570 is coupled to a first input of a subtractor 574 and subtractor 572 is coupled to a second input of the subtractor 574. Subtractors 570 through 572 function to implement the formula $2\Delta f_\Omega=(\Delta f_1-\Delta f_2)-(\Delta f_1-\Delta f_2)$, where the output of the subtractor 574 substantially equals twice $\Delta f_\Omega$.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator fiber-optic gyro (RFOG) comprising:
   a reference laser configured to produce a reference laser beam having a reference frequency;
   a first laser source configured to produce a first laser beam having a first frequency offset from the reference laser beam;
   a second laser source configured to produce a second laser beam having a second frequency offset from the reference laser beam;
   a sensing resonator having a first input coupled to the first laser source and a second input coupled to the second laser source such that the first laser beam propagates through the sensing resonator in a first direction and exits at a first output and the second laser beam propagates through the sensing resonator in a second direction and exits at a second output;
   resonance tracking electronics configured to generate a first control signal that indicates when the first laser beam is off resonance and to generate a second control signal that indicates when the second laser beam is off resonance;
   a first optical combiner coupled between a first output of the sensing resonator and a first input of the resonance tracking electronics, the first optical combiner configured to beat the first output of the sensing resonator with the reference laser beam creating a first beat signal; wherein the resonance tracking electronics is configured to discriminate between the first output of the resonator and at least one rotation-sensing error based on the first beat signal; and
   a second optical combiner coupled between a second output of the sensing resonator and a second input of the resonance tracking electronics, the second optical combiner configured to beat the second output of the sensing resonator with the reference laser beam creating a second beat signal; wherein the resonance tracking electronics is configured to discriminate between the second output of the resonator and at least one rotation-sensing error based on the second beat signal.

2. The fiber optic gyroscope of claim 1, wherein the second laser source is configured to switch the second laser beam between a resonance frequency that is at least one longitudinal resonance mode lower than a resonance frequency of the first direction and a resonance frequency that is at least one longitudinal resonance mode higher than the resonance frequency of the first direction.

3. The fiber-optic gyroscope of claim 1, wherein the resonance tracking electronics comprises:
   a first demodulator coupled to the first input of the resonance tracking electronics and configured to demodulate the first beat signal from the first optical combiner at the first frequency offset;
   a second demodulator coupled to an output of the first demodulator and configured to demodulate the output of the first demodulator at a first resonance tracking modulation frequency for the first laser beam;
   a third demodulator coupled to the second input of the resonance tracking electronics and configured to demodulate the second beat signal from the second optical combiner at the second frequency offset; and
   a fourth demodulator coupled to an output of the third demodulator and configured to demodulate the output of the third demodulator at a second resonance tracking modulation frequency for the second laser beam.

4. The fiber-optic gyroscope of claim 3, wherein a single common-cavity modulation frequency is used as the first resonance tracking modulation frequency and as the second resonance tracking modulation frequency.

5. The fiber-optic gyroscope of claim 3, further comprising:
   a third laser source configured to produce a third laser beam having a third frequency offset from the reference laser beam; and
   a third optical combiner configured to optically mix the second laser beam with the third laser beam to produce a combined laser beam, wherein the combined laser beam is coupled to the second input of the sensing resonator such that the combined laser beam propagates through the sensing resonator in the second direction and exits at the second output;
   wherein the resonance tracking electronics further comprises:
      a fifth demodulator coupled to the second input of the resonance tracking electronics and configured to demodulate the second beat signal from the first optical combiner at the third frequency offset; and
      a sixth demodulator coupled to an output of the fifth demodulator and configured to demodulate the output of the fifth demodulator at the second resonance tracking modulation frequency for the combined laser beam.

6. The fiber-optic gyroscope of claim 5, wherein the first demodulator is configured to demodulate the first beat signal using synchronous demodulation;
   the third demodulator is configured to demodulate the second beat signal using synchronous demodulation; and
   the fifth demodulator is configured to demodulate the second beat signal using synchronous demodulation.

7. The fiber-optic gyroscope of claim 5, wherein a single common-cavity modulation frequency is used as the first resonance tracking modulation frequency and as the second resonance tracking modulation frequency.

8. The fiber-optic gyroscope of claim 7, wherein the resonance tracking electronics further comprises:
   a first accumulator configured to integrate the output of the second demodulator;
   a first summer configured to sum the integrated output of the first accumulator with a first constant;
   a first direct-digital-synthesizer (DDS) coupled to the first summer and configured to output a reference signal to the first laser source which maintains the first laser source on-resonance and to output the reference signal to the first demodulator;

a second DDS configured to output a signal at the common-cavity modulated frequency to the second demodulator, to the forth demodulator, and to the sixth demodulator;
a second accumulator configured to integrate the output of the fourth demodulator;
a second summer configured to sum the integrated output of the second accumulator with a second constant;
a third DDS coupled to the second accumulator and configured to output a reference signal to the second laser source which maintains the second laser source on-resonance and to output the reference signal to the third demodulator;
a third accumulator configured to integrate the output of the sixth demodulator;
a third summer configured to sum the integrated output of the third accumulator with a third constant; and
a fourth DDS coupled to the third accumulator and configured to output a reference signal to the third laser source which maintains the third laser source on-resonance and to output the reference signal to the fifth demodulator.

9. The fiber-optic gyroscope of claim 1, further comprising:
a first preamp coupled to the first optical combiner and the first input of the resonance tracking electronics;
a second preamp coupled to the second optical combiner and the second input of the resonance tracking electronics; and
wherein the resonance tracking electronics further comprises:
a first analog signal conditioner receiving a first signal coupled to the first input of the resonance tracking electronics;
a second analog signal conditioner receiving a second signal coupled to the second input of the resonance tracking electronics;
a first analog-to-digital converter coupled to the first analog signal conditioner;
a second analog-to-digital converter coupled to the second analog signal conditioner; and
wherein the first analog signal conditioner is configured to down convert the first signal to an intermediate frequency and the second analog signal conditioner is configured to down convert the second signal to an intermediate frequency.

10. A system comprising:
a resonator fiber-optic gyroscope configured to measure rotation rate; and
a processing unit coupled to the resonator fiber-optic gyroscope and configured to perform calculations based on the rotation rate measured by the resonator fiber-optic gyroscope;
wherein the resonator fiber-optic gyroscope includes:
a sensing resonator have a first resonance frequency for a first laser beam propagation direction and a second resonance frequency for a second laser beam propagation direction;
an optical mixer coupled to an output of the sensing resonator and configured to mix an output of the sensing resonator with a reference laser, wherein the optical mixer outputs a beat signal; and
a resonance tracking electronics coupled to the optical mixer and configured to demodulate the beat signal at a frequency offset to produce a first demodulated signal; the resonance tracking electronics further configured to demodulate the first demodulated signal at a resonance tracking modulation frequency.

11. The system of claim 10, wherein the fiber optic gyroscope further comprises:
a reference laser configured to produce a reference laser beam having a reference frequency;
a first laser source configured to produce a first laser beam having a first frequency offset from the reference laser beam;
a second laser source configured to produce a second laser beam having a second frequency offset from the reference laser beam;
the sensing resonator having a first input coupled to the first laser source and a second input coupled to the second laser source such that the first laser beam propagates through the sensing resonator in the first laser beam propagation direction and exits at a first output and the second laser beam propagates through the sensing resonator in the second laser beam direction and exits at a second output;
the resonance tracking electronics further configured to generate a first control signal that indicates when the first laser beam is off resonance and to generate a second control signal that indicates when the second laser beam is off resonance
wherein the optical mixer further comprises:
a first optical combiner coupled between a first output of the sensing resonator and a first input of the resonance tracking electronics, the first optical combiner configured to beat the first output of the sensing resonator with the reference laser beam creating a first beat signal; wherein the resonance tracking electronics is configured to discriminate between the first output of the resonator and at least one rotation-sensing error based on the first beat signal; and
a second optical combiner coupled between a second output of the sensing resonator and a second input of the resonance tracking electronics, the second optical combiner configured to beat the second output of the sensing resonator with the reference laser beam creating a second beat signal; wherein the resonance tracking electronics is configured to discriminate between the second output of the resonator and at least one rotation-sensing error based on the second beat signal.

12. The system of claim 11, wherein the second laser source is configured to switch the second laser beam between a resonance frequency that is at least one longitudinal resonance mode lower than a resonance frequency of the first direction and a resonance frequency that is at least one longitudinal resonance mode higher than the resonance frequency of the first direction.

13. The system of claim 11, wherein the resonance tracking electronics comprises:
a first demodulator coupled to the first input of the resonance tracking electronics and configured to demodulate the first beat signal from the first optical combiner at the first frequency offset;
a second demodulator coupled to an output of the first demodulator and configured to demodulate the output of the first demodulator at a first resonance tracking modulation frequency for the first laser beam;
a third demodulator coupled to the second input of the resonance tracking electronics and configured to demodulate the second beat signal from the second optical combiner at the second frequency offset; and
a fourth demodulator coupled to an output of the third demodulator and configured to demodulate the output of the third demodulator at a second resonance tracking modulation frequency for the second laser beam.

14. The system of claim 13, wherein a single common-cavity modulation frequency is used as the first resonance tracking modulation frequency and as the second resonance tracking modulation frequency.

15. The system of claim 13, wherein the fiber optic gyroscope further comprises:
a third laser source configured to produce a third laser beam having a third frequency offset from the reference laser beam; and
a third optical combiner configured to optically mix the second laser beam with the third laser beam to produce a combined laser beam, wherein the combined laser beam is coupled to the second input of the sensing resonator such that the combined laser beam propagates through the sensing resonator in the second direction and exits at the second output;
wherein the resonance tracking electronics further comprises:
a fifth demodulator coupled to the second input of the resonance tracking electronics and configured to demodulate the second beat signal from the first optical combiner at the third frequency offset; and
a sixth demodulator coupled to an output of the fifth demodulator and configured to demodulate the output of the fifth demodulator at the second resonance tracking modulation frequency for the combined laser beam.

16. The system of claim 15, wherein a single common-cavity modulation frequency is used as the first resonance tracking modulation frequency and as the second resonance tracking modulation frequency.

17. The system of claim 16, wherein the resonance tracking electronics further comprises:
a first accumulator configured to integrate the output of the second demodulator;
a first summer configured to sum the integrated output of the first accumulator with a first constant;
a first direct-digital-synthesizer (DDS) coupled to the first summer and configured to output a reference signal to the first laser source which maintains the first laser source on-resonance and to output the reference signal to the first demodulator;
a second DDS configured to output a signal at the common-cavity modulated frequency to the second demodulator, to the forth demodulator, and to the sixth demodulator;
a second accumulator configured to integrate the output of the fourth demodulator;
a second summer configured to sum the integrated output of the second accumulator with a second constant;
a third DDS coupled to the second accumulator and configured to output a reference signal to the second laser source which maintains the second laser source on-resonance and to output the reference signal to the third demodulator;
a third accumulator configured to integrate the output of the sixth demodulator;
a third summer configured to sum the integrated output of the third accumulator with a third constant; and
a fourth DDS coupled to the third accumulator and configured to output a reference signal to the third laser source which maintains the third laser source on-resonance and to output the reference signal to the fifth demodulator.

18. A method of reducing rotation-sensing error in a resonator fiber-optic gyroscope, the method comprising:
optically mixing a first output of a rotation-sensing resonator with a reference laser beam to produce a first optically mixed laser beam;
optically mixing a second output of a rotation-sensing resonator with the reference laser beam to produce a second optically mixed laser beam;
converting the first optically mixed laser beam into a first electric signal;
converting the second optically mixed laser beam into a second electrical signal;
demodulating the first electrical signal at a first selected beat frequency to produce a first demodulated signal;
demodulating the first demodulated signal at a first resonance tracking modulation frequency to produce a second demodulated signal;
demodulating the second electrical signal at a second selected beat frequency to produce a third demodulated signal;
demodulating the third demodulated signal at a second resonance tracking modulation frequency to produce a fourth demodulated signal; and
generating a signal related to rotation rate based upon the second demodulated signal and the fourth demodulated signal.

19. The method of claim 18 wherein a single common-cavity modulation frequency is used as the first resonance tracking modulation frequency and as the second resonance tracking modulation frequency.

20. The method of claim 18 wherein demodulating the electrical signal at a selected beat frequency further comprises:
demodulating the first electrical signal using lock-in detection at a frequency offset that is the beat frequency between the reference laser beam and a first light source; and
demodulating the second electrical signal using lock-in detection at a frequency offset that is the beat frequency between the reference laser beam and a second light source.

* * * * *